US011832630B2

(12) United States Patent
Arechiga et al.

(10) Patent No.: US 11,832,630 B2
(45) Date of Patent: *Dec. 5, 2023

(54) METHODS FOR MAKING HEAT-TREATED CHEESES

(71) Applicant: Glanbia Nutritionals Limited, Kilkenny (IE)

(72) Inventors: Valerie Arechiga, Twin Falls, ID (US); David Perry, Twin Falls, ID (US)

(73) Assignee: Glanbia Nutritionals Limited, Kilkenny (IE)

( * ) Notice: Subject to any disclaimer, the term of this patent is extended or adjusted under 35 U.S.C. 154(b) by 588 days.

This patent is subject to a terminal disclaimer.

(21) Appl. No.: 16/763,072

(22) PCT Filed: Nov. 1, 2018

(86) PCT No.: PCT/US2018/058795
§ 371 (c)(1),
(2) Date: May 11, 2020

(87) PCT Pub. No.: WO2019/089992
PCT Pub. Date: May 9, 2019

(65) Prior Publication Data
US 2020/0345028 A1   Nov. 5, 2020

Related U.S. Application Data

(60) Provisional application No. 62/579,972, filed on Nov. 1, 2017.

(51) Int. Cl.
*C07H 1/00* (2006.01)
*A23C 19/06* (2006.01)
(Continued)

(52) U.S. Cl.
CPC ............ *A23C 19/063* (2013.01); *A23C 19/08* (2013.01); *A23C 19/082* (2013.01); *A23C 19/0921* (2013.01); *A23C 2250/054* (2013.01)

(58) Field of Classification Search
CPC ....................................................... A23C 19/63
(Continued)

(56) References Cited

U.S. PATENT DOCUMENTS 1,186,524 A   6/1916   Kraft
5,750,177 A * 5/1998   Yee .................... A23C 19/0285
426/582

(Continued)

FOREIGN PATENT DOCUMENTS

WO   2005089562 A1   9/2005
WO   2010140905 A1   12/2010
WO   2018076021 A1   4/2018

OTHER PUBLICATIONS

Fu, W , et al., "Effects of pre-cooked cheeses of different emulsifying conditions on mechanical properties and microstructure of processed cheese", Food Chemistry 245, 47-52 (2017).
(Continued)

*Primary Examiner* — Brent T O'Hern
(74) *Attorney, Agent, or Firm* — Viksnins Harris Padys Malen LLP (57) ABSTRACT

Disclosed are methods for producing cheeses having the desirable properties of process cheese, using phospholipase enzyme(s), without the addition of emulsifying salts to produce such cheeses. The methods of the invention allow a cheese processor to produce a reduced-sodium process-type cheese without losing the recognized meltability and texture of processed cheese.

12 Claims, 6 Drawing Sheets

(51) Int. Cl.
*A23C 19/08* (2006.01)
*A23C 19/082* (2006.01)
*A23C 19/09* (2006.01)

(58) Field of Classification Search
USPC .......................................................... 426/38
See application file for complete search history.

(56) References Cited

U.S. PATENT DOCUMENTS

| | | | |
|---|---|---|---|
| 6,551,635 | B2 | 4/2003 | Nielsen |
| 2004/0151801 | A1* | 8/2004 | Sorensen .............. A23C 19/043 426/38 |
| 2007/0281053 | A1 | 12/2007 | Yee et al. |
| 2009/0092730 | A1 | 4/2009 | Smith et al. |
| 2012/0171327 | A1 | 7/2012 | Galpin et al. |
| 2013/0045304 | A1* | 2/2013 | Sorensen ....... C12Y 302/01015 426/549 |
| 2014/0377412 | A1 | 12/2014 | Criezis et al. |
| 2015/0289532 | A1 | 10/2015 | Chiba et al. |
| 2017/0079302 | A1* | 3/2017 | Lotode ................... A23C 19/05 |
| 2019/0261641 | A1* | 8/2019 | Arechiga ............ A23C 19/054 |
| 2020/0022379 | A1* | 1/2020 | Arechiga ............ A23C 19/0921 |

OTHER PUBLICATIONS

Hougaard, A, et al., "Production of Cheese Powder without Emulsifying Salt: Effect of Processing Parameters on Rheology and Stability of Cheese Feed", Annual Transactions of the Nordic Rheology Society 21, 315-216 (2013).
Kapoor, R, et al., "Process Cheese: Scientific and Technological Aspects—A Review", Comprehensive Reviews in Food Science and Food Safety 7, 194-214 (2008).
Kelly, A, et al., "Pre-treatment of cheese milk : principles and developments", Dairy Sci Technol 88, 549-572 (2008).
Nunes, K, "Clean label—a $180 billion global opportunity", https://www.foodbusinessnews.net/articles/6980-clean-label-a-180-billion-global-opportunity, 4 pages (2016).
Patent Cooperation Treaty, International Search Report and Written Opinion for PCT/US2018/058795, 7 pages, dated Jan. 22, 2019.
Zimmerman, E, "2015 trends and dairy solutions", Trends and Dairy Solutions, http://www.cheesemarketnews.com/guestcolumn/2014/21nov14_01.html, 2 pages (2014).

* cited by examiner

METHODS FOR MAKING HEAT-TREATED CHEESES

FIELD OF THE INVENTION

The invention relates to methods for making cheeses. More specifically, the invention relates to functional ingredients and methods for making cheese, such as heat-treated (i.e., process-like cheeses), with desirable melting qualities.

BACKGROUND OF THE INVENTION

Process, or processed, cheese can be found in recipes for dishes as varied as macaroni and cheese, dips, appetizers, and casseroles. Slices of processed cheese are often added to sandwiches, or used as the foundation of the sandwich (e.g., grilled cheese). However, according to a November 2014 online article published by Cheese Market News, while consumption of natural cheese in all forms and markets had increased over the past 10 years, consumption of processed cheese had declined (Zimmerman, E., 2015 Trends and Dairy Solutions, *Cheese Market News*, http://www.cheesemarketnews.com/guestcolumn/2014/21nov14_01.html). One of the reasons for this decline is the public's desire for lower-sodium alternatives.

According to the United States Food and Drug Administration, "[t]he majority of sodium consumed comes from processed and prepared foods, not the salt shaker. This makes it more difficult for all of us to control how much sodium we consume.

Some companies have reduced sodium in certain foods, but many foods continue to contribute to high sodium intake, especially processed and prepared foods" (http://www.fda.gov).

Salt is incorporated into cheese for more than just flavor. Salt can also provide a desirable functionality in cheese production. During the manufacture of natural cheese, salt is added to the curd after the desired pH is reached, helping to control fermentation and proteolysis by regulating starter cultures and enzymes. Salt also lowers the water activity of cheese, preventing the growth of undesirable microorganisms. Process cheese is produced by blending natural cheese(s) with emulsifying salts and other ingredients, then heating and mixing to form a homogeneous product with an extended shelf life. The emulsifying salts make process cheese flow when heated. Emulsifying salts also maintain homogeneity of the melted process cheese, while natural cheese tends to separate and expel the fats and oils from the casein matrix when heating to melting temperature. Emulsifying salts have been a part of cheese production since the early 1900s, when Walter Gerber and Fritz Stettler of Switzerland added sodium citrate to Emmentaler cheese. Around the time of World War I, J. L. Kraft developed a process for pasteurizing cheese to make a more shelf-stable form, for which he received U.S. Pat. No. 1,186,524 in 1916. These two advancements led to the "pasteurized process cheese" that is produced today.

Kapoor and Metzger provide an excellent discussion of the process that takes place when emulsifying salts are added during the manufacture of process cheese (Kapoor, R. and Metzger, L. E., Process Cheese: Scientific and Technological Aspects—A Review, *Comprehensive Reviews in Food Science and Food Safety* (2008) 7: 194-214). Stated in very simplistic terms, however, there are calcium linkages between caseins in milk, but many more of them form as rennet enzymes cause the proteins to form curds, with calcium providing ionic bridges for coagulation. Calcium ions help hold the proteins together. When sodium citrate is added during the production of process cheese, it replaces the calcium ions with sodium ions. The casein becomes less hydrophobic and more soluble. The disrupted casein complexes also tend to coat the fat particles. This produces a structure that is more flexible than the original natural cheese from which the process cheese is made, and which can still maintain its association with the fat molecules as it is heated, rather than "oiling off" much of the fats/oils. The desirable properties of process cheese that this combination is designed to produce are a tendency of the process cheese to soften upon heating and tendency of the process cheese to spread and flow when completely melted.

Emulsifying salts (ES) are ionic compounds made up of monovalent cations and polyvalent anions. The primary functions of emulsifying salts in process cheese are disruption of the calcium-phosphate-linked protein network present in natural cheese during process cheese manufacture and pH adjustment. Thirteen emulsifying salts are listed in the United States Code of Federal Regulations as approved for use in making process cheese: mono-, di-, and tri-sodium phosphates, dipotassium phosphate, sodium hexametaphosphate, sodium acid pyrophosphate, tetrasodium pyrophosphate, sodium aluminum phosphate, sodium citrate, potassium citrate, calcium citrate, sodium tartrate, and sodium potassium tartrate. It should be noted that most of those compounds contain sodium. According to Zehren and Nusbaum, calcium citrate was added to the list as the result of a request by an industry scientist who recognized that it was also produced during the production of sodium-based ES and in combination worked better than with one emulsifier alone. (Zehren, V. L. and D. D. Nusbaum, *Process Cheese*, ©1992, Schreiber Foods, Green Bay, Wis., p. 66). The use of a calcium-based emulsifying salt is, however, counter to current reasoning among those of skill in the art such as Galpin et al. (WO2010/140905), who disclosed a method for reducing or eliminating the need for emulsifying salts for making heat-treated cheese, but the method required removing a substantial amount of calcium from the starting material or intermediates in the process. In their disclosure, they stated that "unless the calcium content of the cheese . . . is significantly reduced, process cheese and related products cannot be made without emulsifying salts." (Page 4, lines 4-6.)

Consumers have recognized a need for lower-sodium products, as well as products with fewer additives. "On the market there is a growing demand from consumers and authorities for food produced without additives, including emulsifying salt, and currently especially sodium." (Hougaard, A. B. et al., Production of Cheese Powder without Emulsifying Salt: Effect of Processing Parameters on Rheology and Stability of Cheese Feed, Annual *Transactions of the Nordic Rheology Society* (2013) 21:315-16). According to an October 2016 online article in *Food Business News*, in 2015, Euromonitor estimated global sales of clean label products to be $165 billion, with $62 billion of that being from North America alone (http://www.foodbusinessnews.net/articles/news_home/Business_News/2016/10/Clean_label_a_$180_billion_gl.aspx?1D={35B6F389-F481-4BF5-8DD1-9BAB90D5EA8B}&cck=1). Reducing or eliminating the use of emulsifying salts could make those cheese products more "clean label."

The FDA website states that the United States Centers for Disease Control (CDC) "has compiled a number of key studies, which continue to support the benefits of sodium reduction in lowering blood pressure. In some of these studies, researchers have estimated lowering U.S. sodium intake by about 40 percent over the next decade could save 500,000 lives and nearly $100 billion in healthcare costs." It also states that the World Health Organization has recommended a global reduction in sodium intake and there are 75 countries working to reduce sodium intake with 39 having already set target sodium levels for one or more processed foods.

The emulsifying salts that are added to produce processed cheese products increase the sodium content of the resulting cheese. Although the addition of salt is a necessary step in commercial cheese processing, finding a substitute for these added emulsifying salts provides cheesemakers with one approach for decreasing the salt content of process cheese products. But, even in proposed improvements to the method of making processed cheese such as that disclosed by Galpin (WO2010/140905), sodium or potassium ions are added.

What are needed are new and better compositions and methods for reducing and/or eliminating the use of emulsifying salts in processed cheese.

SUMMARY OF THE INVENTION

The invention relates to a method for making a heat-treated cheese, the method comprising admixing with at least one shredded natural cheese a composition comprising at least one phospholipase, and heat-treating the shredded natural cheese to produce a heat-treated cheese. In various embodiments, the natural cheese comprises at least one cheese that has not been made by the addition of phospholipase before or during the process of producing cheese curds. In various embodiments, the natural cheese is selected from the group consisting of cheese curds, fresh cheese, aged cheese, and combinations thereof. In various embodiments, the method for making a heat-treated cheese also comprises adding a calcium composition to the at least one shredded natural cheese. In various embodiments, the calcium composition is selected from the group consisting of inorganic minerals, at least one milk mineral composition, at least on algal mineral composition, at least one plant mineral composition, and combinations thereof.

The invention also relates to a method for making a heat-treated cheese, the method comprising shredding at least one cheese to which phospholipase was added before or during the process of producing cheese curds from cheese milk, and producing a heat-treated cheese by heat-treating the shredded natural cheese using a heating method comprising a preheating step followed by a heating step (i.e., heat-treating step). In its various embodiments, this method can be performed without the addition of a functionally effective amount of one or more emulsifying salts.

The invention also relates to a method for making a heat-treated cheese, the method comprising preheating a mixture comprising shredded cheese at a temperature of from about 95 degrees Fahrenheit to about 105 degrees Fahrenheit, followed by heat-treating the mixture at a temperature of from about 165 degrees Fahrenheit to about 185 degrees Fahrenheit.

DETAILED DESCRIPTION

Figure 1:
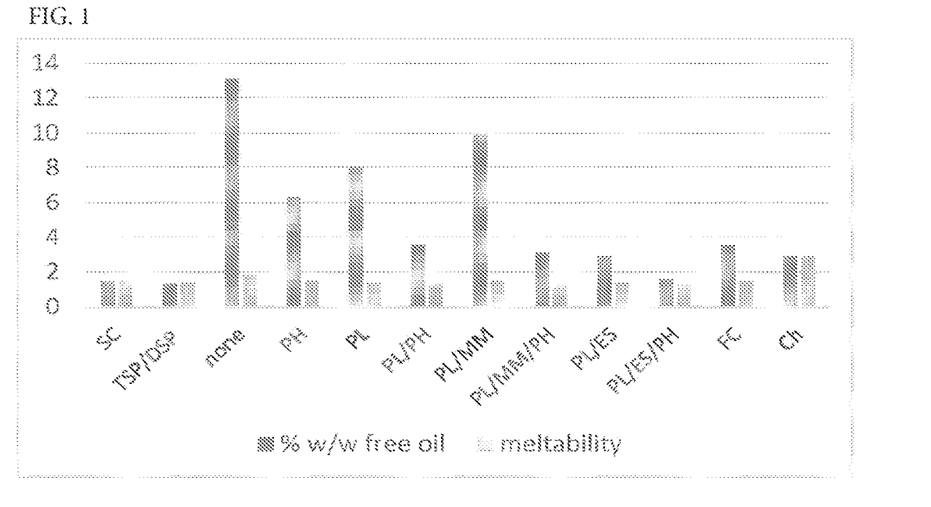
FIG. 1 is a bar graph illustrating the percentage of free oil (w/w) and meltability score for heat-treated cheese products made using the indicated ingredients and/or treatments. Lower numbers for free oil indicate stronger emulsification, and higher numbers for the meltability score indicate an increase in area or 'spreading.'
Figure 2:
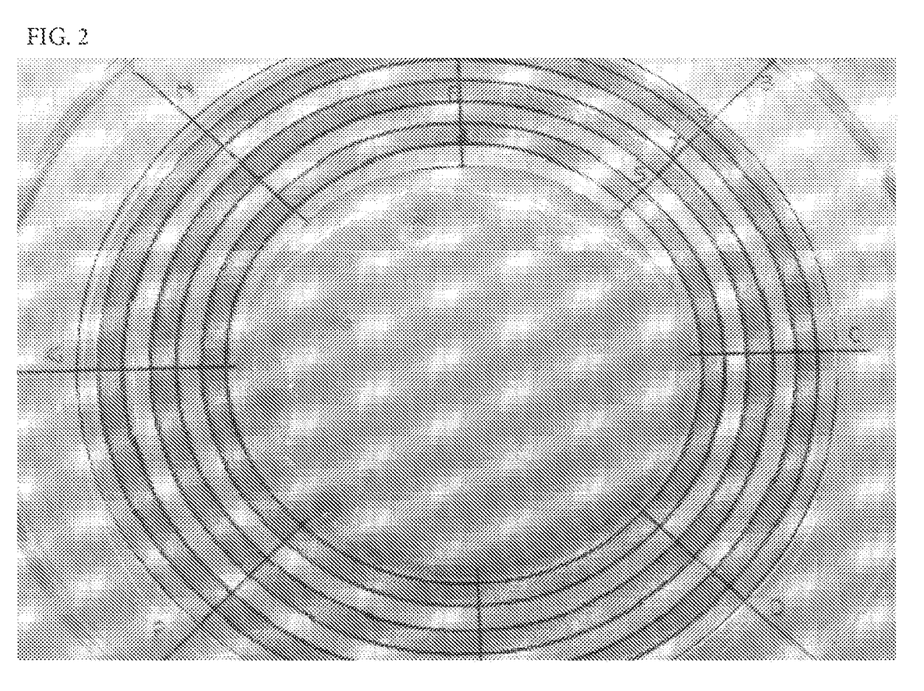
FIG. 2 is a photograph of a functional cheddar (FC), a Cheddar cheese made from milk treated with phospholipase after subjugation to 150° C. for 5 minutes in a forced air oven.
Figure 3:
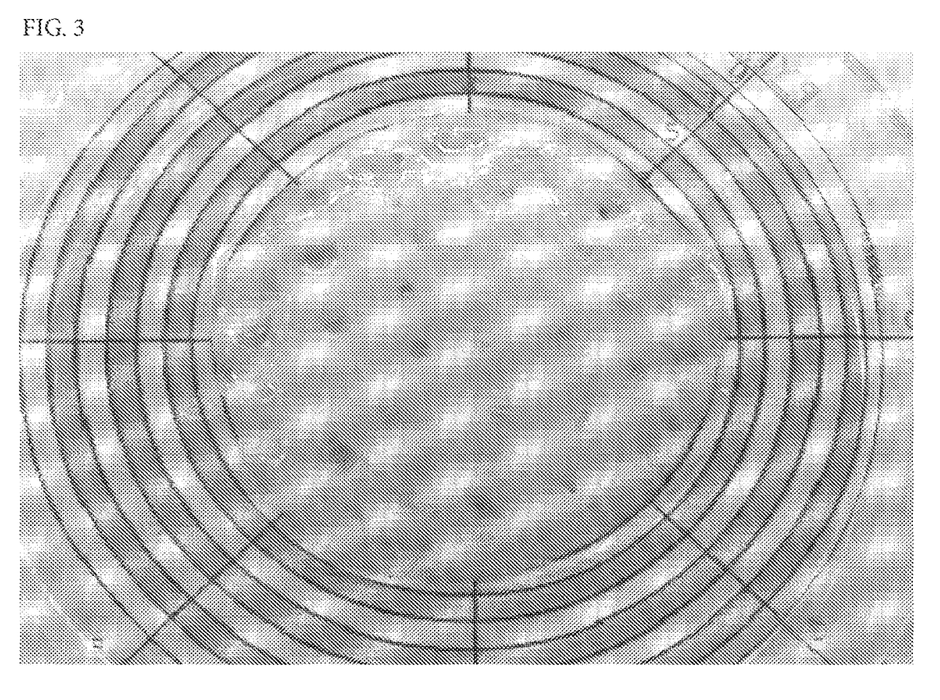
FIG. 3 is a photograph of a natural Cheddar cheese made in the typical way after subjugation to 150° C. for 5 minutes in a forced air oven
Figure 4:
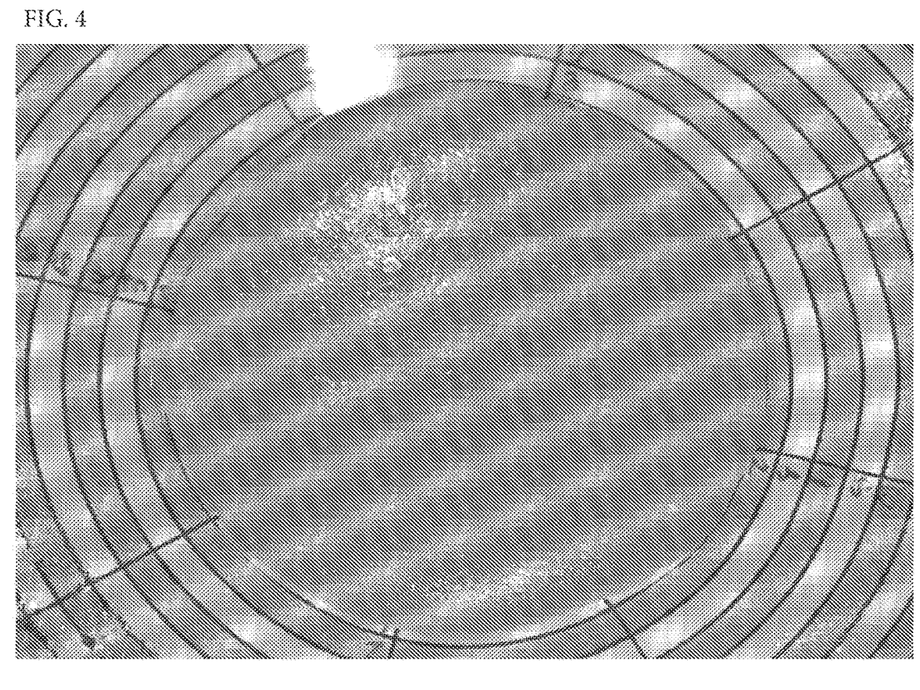
FIG. 4 is a photograph of a heat-treated cheese made from at least one cheese made from phospholipase treated milk, and with a 2.5 minutes preheat at 95-104° F. No milk minerals or emulsifying salts were added.
Figure 5:
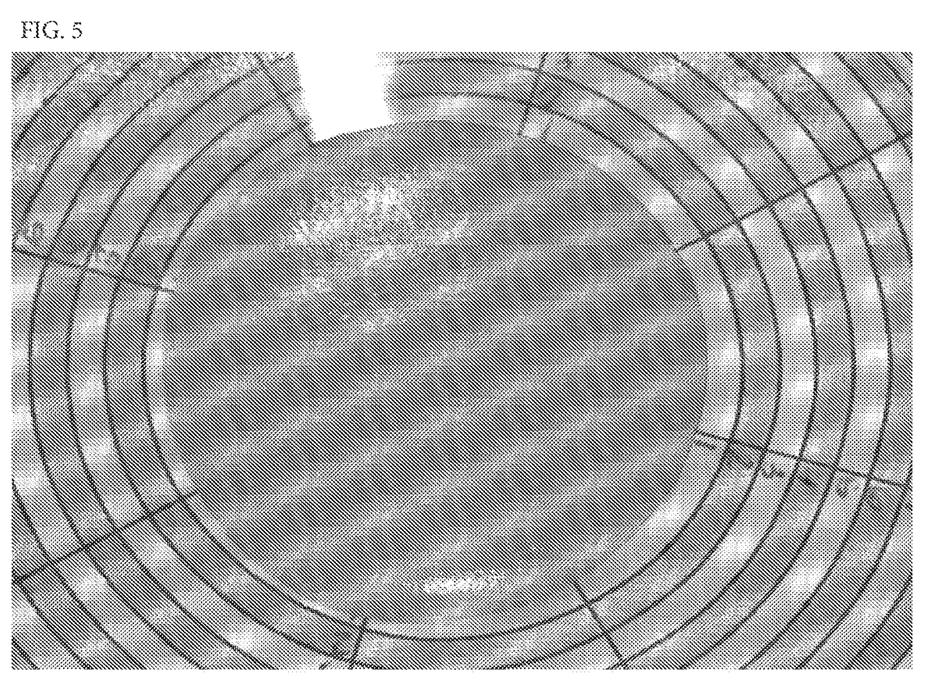
FIG. 5 is a photograph of a heat-treated cheese made from at least one cheese made from phospholipase treated milk, less than 1% w/w of milk minerals, and with a 2.5 minutes preheat at 95-104° F. No emulsifying salts were added.
Figure 6:
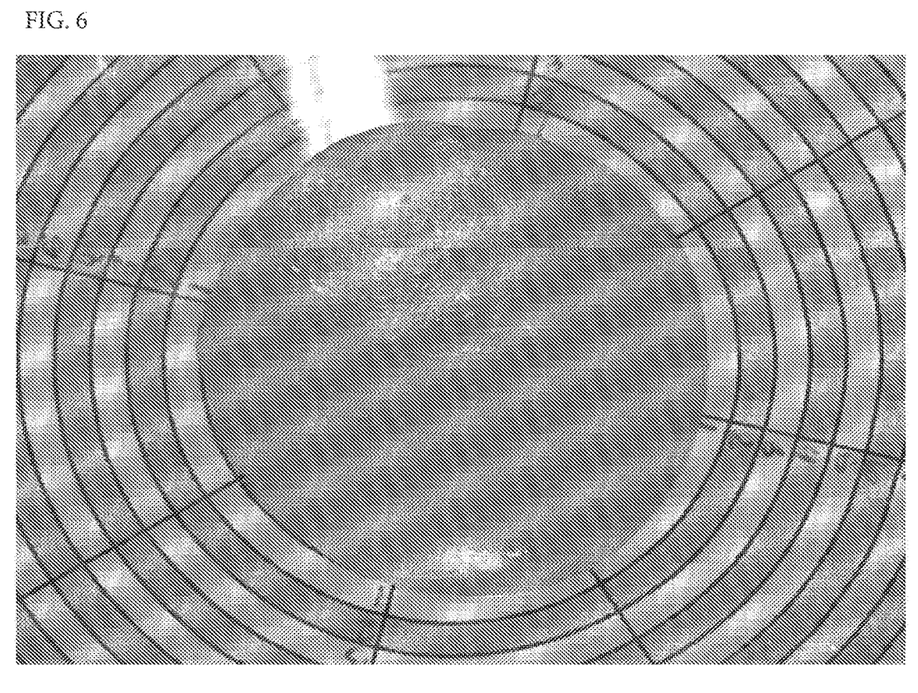
FIG. 6 is a photograph of a standard process cheese made with 3% sodium citrate, standard cheddar, and no milk minerals.

The inventors have developed a method for eliminating the need for emulsifying salts in the manufacturing of heat-treated cheeses while producing heated-treated cheese products that maintain the desired stability and meltability of heated-treated cheese, but are lower in sodium than similar products made with emulsifying salts. They have developed a method for making a heat-treated cheese, the method comprising admixing with at least one shredded natural cheese a composition comprising at least one phospholipase, and producing a heat-treated cheese by heat-treating the shredded natural cheese. In various embodiments, the natural cheese comprises at least one cheese that has not been made by the addition of phospholipase before or during the process of producing cheese curds. In various embodiments, the method for making a heat-treated cheese also comprises adding a calcium composition to the at least one shredded natural cheese. In various embodiments, the calcium composition is selected from the group consisting of inorganic minerals, at least one milk mineral composition, at least on algal mineral composition, at least one plant mineral composition, and combinations thereof.

The invention also relates to a method for making a heat-treated cheese by shredding at least one cheese to which phospholipase was added before or during the process of making the cheese from cheese milk, and producing a heat-treated cheese by heat-treating the shredded natural cheese, using a heating method comprising a preheating step followed by a heating step (i.e., heat-treating step). The method can be successfully performed without the addition of a functionally effective amount of one or more emulsifying salts. The benefit of the preheating step is unexpected, since those in the industry generally concur with Glenn et al. that modifying the thermal history of process cheese can significantly impact product melt, yet (T. A. Glenn III, et al. A Statistical Analysis of Creaming Variables Impacting Process Cheese Melt Quality, *Journal of Food Quality* (2003) 26:299-321).

The invention also relates to a method for making a heat-treated cheese, the method comprising preheating a mixture comprising shredded cheese at a temperature of from about 75 degrees Fahrenheit to about 120 degrees Fahrenheit for at least about 5 minutes, followed by heat-treating the mixture at a temperature of from about 155 degrees Fahrenheit to about 185 degrees Fahrenheit. In various embodiments, the method can also comprise an additional step of adding to the shredded cheese at least one phospholipase-treated milk product. In various embodiments, the at least one phospholipase-treated milk product can be selected from the group consisting of milk powder, buttermilk powder, milk concentrate, milk permeate, powdered cream, cream permeate, concentrated cream, and combinations thereof.

Previously, Galpin et al. (WO2010/140905) disclosed a method for reducing or eliminating the need for emulsifying salts for making heat-treated cheese, but the method required removing a substantial amount of calcium from the starting material or intermediates in the process. In their disclosure, they stated that "unless the calcium content of the cheese . . . is significantly reduced, process cheese and related products cannot be made without emulsifying salts." (Page 4, lines 4-6.) Fox et al. state that "[a]pplication of heat and mechanical shear to natural cheese in the absence of stabilisers usually results in a heterogeneous, gummy, pudding-like mass which oils-off extensively." [This] "can be prevented by the addition of ESs [emulsifying salts], at a level of 1-3% (w/w) to the cheese blend prior to processing." (Fox, P., et al. *Fundamentals of Cheese Science,* 2017, Springer Publishing, p. 601.)

Pasteurized process cheese has a legal definition. According to 21 CFR 133.169(a)(1), "[p]asteurized process cheese is the food prepared by comminuting and mixing, with the aid of heat, one or more cheeses of the same or two or more varieties, except cream cheese, Neufchatel cheese, cottage cheese, low-fat cottage cheese, cottage cheese dry curd, cook cheese, hard grating cheese, semisoft part-skim cheese, part-skim spiced cheese, and skim milk cheese for manufacturing with an emulsifying agent prescribed by paragraph (c) of this section into a homogeneous plastic mass." Therefore, in the present disclosure the term "heat-treated cheese" will be used to describe the cheese resulting from the method of the invention, as the method does not require the use of emulsifying salts such as those that meet the legal definition for "process cheese."

The importance of emulsifying salts in standard methods for making process cheese is evident in the various descriptions of the transformation that is performed when process cheese is made. Lu et al. (Lu, Y. et al. Effects of pH on the Textural Properties and Meltability of Pasteurized Process Cheese Made with Different Types of Emulsifying Salts, *J. Food Sci.* (2008) 73(8): E363-E369) explain that "[d]uring process cheese manufacture, the cheese base softens and melts due to heat and shear, the caseins become dispersed, the fat is emulsified with solubilized caseins and during cooling a new cheese matrix is formed. Casein dispersion (or peptization) during cooking is dependent on the type and concentration of emulsifying salts (ES) used as they bind calcium that is involved in crosslinking the caseins in cheese and the addition of ES also increase the pH, which promotes increased electrostatic repulsion." Process cheese manufacture involves a process known as "calcium sequestration." This involves the exchange of calcium ($Ca^{2+}$) of the paracasein for the sodium ion of the emulsifying salt. Replacing calcium with sodium as the counterion to the negatively-charged casein increases the protein hydration and alters the textural properties of the cheese. (Kilcast, D. and Angus, F., eds. *Reducing Salt in Foods: Practical Strategies,* Woodhead Publishing Ltd. (England)/CRC Press LLC (U.S.), ©2007, page 329 (section 16.4.3)). However, the inventors have discovered that heated cheese products, the types of cheeses having the same, or improved, properties as compared to those cheeses referred to in the industry as "process" cheese, or "pasteurized process" cheeses, can very successfully be made without the use of emulsifying salts and without the step of calcium depletion.

Phospholipase has previously been used to increase cheese yield, generally by increasing the water and fat retention within the resulting curd, by treating cheese milk with phospholipase. Normally, 75% of milk protein and 85%-90% of milk fat are entrapped in the cheese curd. The rest is lost in whey during the production of cheese, when the curds are separated from the whey. Lysophospholipids can improve cheese yield by about 0.7%-3.8%. Phospholipase treatment of "cheese milk," the milk from which cheese is made, results in cleavage of fatty acids from phospholipids in the milk fat globule membrane (MFGM) which surrounds fat globules in milk, releasing lysophospholipids in the process. During cheese production, the fat is concentrated in the cheese curd and the MFGM is damaged during processing, with MFGM fragments migrating into the whey. So, it has been standard practice in recent years to treat the cheese milk with phospholipase when phospholipase is used in cheese production, because it is at this stage where the desired effect (increasing yield) can be achieved. Research reports have indicated, however, that phospholipase treatment has no noticeable effect on meltability, stretchability, or browning of pizza cheese/mozzarella made using phospholipase-treated cheese milk (Helier, Erik et al. Enhancing cheese yield by phospholipase treatment of cheese milk, *Australian Journal of Dairy Technology* (July 2006) 61: 2; Lilbk, H. M. et al. Improving the Yield of Mozzarella Cheese by Phospholipase Treatment of Milk, *J. Dairy Sci.* (2006) 89: 4114-4125).

The inventors have discovered that treatment of the cheese curds and/or cheese with phospholipase, in combination with heat treatment, results in a cheese product that has process-cheese characteristics without the added salt previously required to make processed cheese. This is unexpected, because at this stage most of the phospholipids are concentrated in the cheese curd and are therefore less available to the enzyme, and the milk fat globule membrane has generally been damaged during cheese production, with fragments of MFGM migrating into the whey that has been separated during cheese production. Whereas phospholipase treatment of cheese milk has no notable effect on meltability, stretchability, or other physical or sensory attributes of the resulting cheese, the inventors have discovered that the addition of phospholipase to the curd(s) or cheese, in combination with heat treatment, does produce the physical changes that distinguish a processed cheese from a natural cheese, providing a method whereby heat-treated cheese can be made without the addition of emulsifying salts.

Since the term "process cheese" has a specific legal definition in the United States and many other countries, products made by the method of the invention will be referred to herein as "heat-treated" cheeses in order to minimize confusion and distinguish them from the "process cheese" to which emulsifying salts are added. "Process cheese" and "heat-treated cheese" are distinguishable from "natural cheese." Process cheese is made by comminuting and mixing, with the aid of heat, one or more cheeses of the same or two or more varieties, using an emulsifying agent prescribed by 37 CFR 133.169(c): "one or any mixture of two or more of the following: [m]onosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, and sodium potassium tartrate, in such quantity that the weight of the solids of such emulsifying agent is not more than 3 percent of the weight of the pasteurized process cheese." "Heat-treated cheese" is made by comminuting and mixing, with the aid of heat, one or more cheeses of the same or two or more varieties—without the addition of an amount of emulsifying salt needed to aid, in a significant manner, the emulsification of the comminuted, heated cheese mixture. Preferably, heat-treated cheese is made without the addition of any emulsifying salt in order to maintain a lower sodium content and produce a lower-salt cheese product. Therefore, the terms "heat-treated cheese" and "process cheese" will be used separately herein to denote a product comprising heat-treated cheese that is made without the use of emulsifying salt(s) ("heat-treated cheese") and a product comprising heat-treated cheese that is made with emulsifying salts ("process cheese").

The term "emulsifying salt" is used herein to mean a chemical compound selected from the group consisting of monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, sodium potassium tartrate, and combinations thereof. "Emulsifying salt" may therefore denote a combination of more than one. "Emulsifying salt" can also denote types of salts, including, but not limited to the salts listed above, which can be used to promote melting in cheese—particularly those sodium- and/or potassium-containing salts. A functionally effective amount of emulsifying salt is an amount that one of skill in the art would recognize as able to produce an effect sufficient to result in the production of a processed cheese, as opposed to a minimal amount of one or more emulsifying salt added for a different purpose, for example.

"Natural cheese" is not specifically defined under 37 CFR 133, although the requirements for labeling specific cheeses are included in that section, but is understood in the industry to include cheeses that are made by a process that comprises four basic steps: coagulating, draining, salting, and ripening, as compared to processed cheese manufacture which incorporates extra steps such as cleaning, blending, and melting (as well as adding emulsifiers). Natural cheeses include familiar varieties such as Cheddar, Colby, Monterrey Jack, Provolone, Mozzarella, Gouda, Swiss, Havarti, etc. As used herein, "natural cheese" is made without adding phospholipase before or during the cheesemaking process (i.e., coagulating, draining, salting, ripening) and phospholipase-treated cheese ("PL-treated cheese") is made by adding phospholipase to the cheese milk before or during the process of producing cheese curds. It should be noted that the cheesemaking process results in the production of a cheese such as Cheddar, Colby, Monterrey Jack, etc., while the process for making heat-treated cheese starts with one or more of these cheese products and produces, via the heat treatment, process cheese, pasteurized process cheese, or heat-treated cheese (with minimal to no emulsifying salt(s) added).

"Pasteurized process cheese" and "process cheese" are often used interchangeably, as many process cheeses are also pasteurized. The general method for making pasteurized process cheese is known to those of skill in the art and is described, for example, by Patrick Fox et al. in the $2^{nd}$ edition of Fundamentals of Cheese Science (©2017, Springer Publishing) at pages 596-599. One of the initial steps is reducing the size of the natural cheese product(s) from which the heat-treated cheese will be made. This can be accomplished by the use of "curd breakers," which break the cheese into smaller chunks, or by shredders, which shred the cheese. Therefore, where the term "shredded cheese" is used herein, it is intended that "shredded" can be used interchangeably with any form of mechanical size reduction of cheese blocks to form smaller pieces and that "shreds" can be used interchangeably with chunks or other smaller pieces formed by mechanical size reduction of the blocks of natural cheese. The terms "shreds" and "shredding" are therefore not intended to be limiting to a particular size and shape of cheese or a particular method for size-reduction, but are a more convenient way to collectively refer to the product(s) and process(es) which can be used for the method of the invention. Shredding is a common method for producing smaller pieces of cheese, and shreds may be of various sizes, depending upon the type of shredder used. At a next step, the shredded cheese is blended with other ingredients that the formulator intends to incorporate into the final heated cheese product—such as, for example, inclusions, flavorings, and/or emulsifying salts, if desired. Next, the blend is heated, with constant agitation until a "uniform molten consistency" is produced. ("Uniform molten consistency" refers to a consistency that is relatively fluid, flowing, without visible clumps, for example.) A heating step can be performed, for example, by direct or indirect steam injection into a kettle-type cooker, producing temperatures of from about 75 to about 85 degrees Celsius. The heating/agitating step usually lasts from about 1 to about 5 minutes. Additional steps in the process may include homogenization, packaging, cooling, and storage of the resulting heat-treated cheese. "Packaging" may include a step of forming and cooling, then packaging, where required or desired by a cheese processor. "Heat-treated" cheese, as used herein, is cheese that has been produced by a similar method, but without the addition of a functionally effective amount of emulsifying salts (i.e., an amount of emulsifying salts effective to produce process cheese thereby).

The inventors have discovered that the addition of a step comprising preheating a formulation comprising at least one shredded natural cheese at a temperature of from about 75 degrees to about 120 degrees Fahrenheit, before heat-treating the cheese as has commonly been done in the art (at a temperature of from about 155 degrees Fahrenheit to about 185 degrees Fahrenheit), produces improved results whether the heat-treated cheese is made with or without emulsifying salts, phospholipase, added calcium compositions, etc. This goes against the general consensus in the art, since those of skill in the art generally agree that increasing processing time can have negative effects on the heat-treated cheese product and the properties of processed cheese products can be dramatically altered by adjusting processing conditions. (Tamime, A. Y., *Process Cheese and Analogs,* ©2011 Blackwell Publishing, Chapter 3, Section 3.7). The invention therefore also relates to a method comprising preheating a formulation comprising at least one shredded natural cheese at a temperature of from about 75 degrees to about 120 degrees Fahrenheit, followed by the step of heating the cheese at a temperature of from about 155 degrees Fahrenheit to about 185 degrees Fahrenheit. Preferably, the preheating step is performed for at least about 5 minutes. Preferably, the step of heating the cheese at a temperature of from about 155 degrees Fahrenheit to about 185 degrees Fahrenheit is performed with constant agitation until a uniform molten consistency is produced in the cheese mixture. Alternatives to this method may, however, be recognized by one of skill in the art, given the disclosure herein. For example, shredded cheese may be subjected to the preheat step, re-formed, and supplied to a process cheese manufacturer, who completes the process by using the standard heat-treatment process, heating the cheese (generally with agitation) to a temperature of from about 155 degrees Fahrenheit to about 185 degrees Fahrenheit. This would allow a cheese manufacturer to supply a value-added product to a process cheese manufacturer. Where the process cheese manufacturer chooses to reduce or eliminate emulsifying salts from its products, with a corresponding reduction in sodium content, a heat-treated cheese having excellent melting properties can be made by this method.

The use of phospholipase (PL) to make cheese has previously been disclosed in U.S. Pat. No. 6,551,635 (Nielsen, 2003), which also discloses that PL-treated cheese can be used to make processed cheese using emulsifying salts ("Processed cheese may be manufactured from natural cheese or cheese analogues by cooking and emulsifying the cheese including emulsifying salts (e.g. phosphates and citrate), and may also include spices/condiments." Column 2, line 66 to Column 3, line 2.) Nielsen discloses the use of phospholipase to produce cheese, wherein the phospholipase is added to treat the cheese milk or is added as cheese is produced from the cheese milk. The inventors have discovered that it is not necessary to use emulsifying salts when using PL-treated cheese to make heat-treated cheese. PL-treated cheese can readily be used to produce a heat-treated cheese without the addition of emulsifying salts, or any functional substitute therefor. They have also discovered that it is not necessary to begin with PL-treated cheese milk, but that phospholipase can be added to natural cheese after size reduction (e.g., to shredded cheese), or to cheese curds, and that cheese can be heat-treated to produce heat-treated cheese with good "process cheese" properties (e.g., less oiling off, better meltability).

Furthermore, the present inventors have discovered that heat-treated cheese having the desired meltability and oil retention can be made by using either natural cheese or PL-treated cheese (or both) if the phospholipase is added to the shredded cheese prior to the step of heat-treatment. If the preheat step is added to the process for making heat-treated cheese using phospholipase, PL can be added before or during that preheat step. Whichever option is chosen, it is still unnecessary to add emulsifying salt(s) to produce heat-treated cheese that has the properties that have been so desirable in pasteurized process cheese.

Phospholipases (A1, A2, B, C and D) are a group of enzymes that hydrolyze phospholipids (PLs) releasing a variety of compounds and/or functional groups (e.g., free fatty acids (FFAs), lyso-phospholipids, di-acylglycerols), depending on the site of hydrolysis. Phospholipases for commercial use in cheese production are available from a variety of sources, one such phospholipid product being YieldMax® (CHR Hansen), which has been described as "a standardized solution of a *Fusarium venenatum* phospholipase produced by submerged fermentation with an *Aspergillus oryzae* strain" (CHR Hansen, product information sheet). A phospholipase such as YieldMax®, for example, can be used to treat cheese milk at from about 0.0044 to about 0.0220% w/w of milk. When the phospholipase is added to shredded cheese in the cooker, it is generally added at from about 0.05 to about 0.16% w/w of finished product. When phospholipase is added to the cheese curds before salting, it is generally added at up to about 0.27% w/w of cheese. "Phospholipase" includes enzymes with phospholipase activity (e.g., phospholipase A ($A_1$ or $A_2$) or phospholipase B activity). Those of skill in the art will recognize that molecules having phospholipase activity may also have other enzymatic activity, as well. Suitable sources of phospholipases are disclosed, for example, in Nielsen's U.S. Pat. No. 6,551,635 from Column 7, Line 54 to Column 8, Line 17.

Mineral compositions comprising calcium can also be added in conjunction with phospholipase when producing heat-treated cheese. For example, both PL and milk mineral (MM) can be added to the shredded natural cheese before the preheat step, during the preheat step, and/or before the heat-treatment step. "Milk mineral," also known as "dairy mineral," as well as "whey minerals" is isolated by various means from the liquid milk permeate stream containing the mineral fraction, concentrated, and dried to provide a powder form. The term may also more broadly be used to describe the liquid fraction containing minerals from milk. Milk contains a distinctive mineral profile, and milk mineral therefore has a combination of particular minerals in about the same ratios at which they are found within the natural milk product. Milk mineral is therefore a composition comprising minerals isolated from milk which generally contains no added non-dairy chemicals or artificial ingredients, providing a "clean label" alternative to emulsifying salts (melting salts) for use in cheese processing. Commercially-available milk mineral contains varying amounts of protein, depending upon the target use for the milk mineral composition. Milk mineral is also available in, for example, high milk mineral whey protein concentrates, whey protein isolates, milk protein concentrates, and milk protein isolates. Minerals in milk mineral, in order from highest to lowest percentages, include calcium, phosphorus, sodium, magnesium, and potassium. For consumers who are interested in "clean label" products, heat-treated cheese made by the use of milk mineral should provide an attractive option. Milk mineral is commercially available from a variety of sources, including Glanbia Nutritionals, Inc., Arla Foods, Inc., and Fonterra. Mineral composition of two commercially-available milk mineral products produced by Glanbia Nutritionals, Inc. (Twin Falls, Id. USA) are listed in Table 1.

TABLE 1

Milk Mineral Composition

| Product Name | Calcium (%) | Phosphorus (%) | Sodium (%) | Magnesium (%) | Potassium (%) |
|---|---|---|---|---|---|
| Glanbia milk mineral | 24.8 | 14 | 0.62 | 1.4 | 0.7 |
| Optisol ® 1200 | 24.8 | 14.4 | 0.62 | 1.4 | 0.7 |

Mineral compositions containing significant amounts of calcium can also be isolated from plant sources, as some plants are known to be significant sources of calcium. Mineral compositions containing significant amounts of calcium can also be isolated from algae, some of those compositions being currently marketed under trade names such as "AlgaeCal®." Those of skill in the art will also be aware that mineral compositions can be isolated from some microbiological sources such as bacteria, and that these compositions, which contain calcium in conjunction with other minerals such as, for example, phosphorus and magnesium, can be artificially reproduced by those of skill in the art by admixing inorganic minerals in the appropriate proportions. All of the foregoing can be added, as desired by the formulator, as part of the method of the invention. For example, inorganic calcium and phosphate (e.g., calcium phosphate) can be used at a level of from about 0.25% to about 3% w/w of heat-treated cheese to produce a heat-treated cheese without the addition of emulsifying salts.

In various embodiments, at least one inclusion such as pepper chunks and/or flakes, colors, flavors, fruit pieces and other inclusions are admixed with the natural cheese and milk mineral. Typically, the invention would be most broadly used in the dairy industry, where cheeses are most often produced using milk from domestic dairy cattle but could apply to cheese from other animal sources such as sheep, goats, camels etc.

It should be noted that aging provides time for cheese curds to knit to form a cohesive cheese consistency and continued aging leads to aged cheese with increase protein hydrolysis. Various aged cheese can be incorporated into the technology to vary the intensity of various functional attributes such as melt, stretch, stringiness, oiling off etc. Therefore, the functionalities of the functional cheeses and/or heat-treated cheeses that are produced by the method of the invention may be varied by those of skill in the art, as desired, by taking into account the age of cheese(s) used, the types of cheese used, and the level of milk mineral used to make heat-treated cheese. For example, the inventors have demonstrated that, when adding milk mineral, for example, varying the amount of milk mineral utilized in manufacturing a heat-treated cheese for use on pizza can increase the amount of stringiness, or stretch in the resulting cheese. Generally, in their experiments with heated-treated cheese containing Cheddar or Colby Jack, lower amounts (about 1.5 percent milk mineral, rather than about 2 percent milk mineral, for example) have resulted in more stretch/stringiness. They also noted that the use of less aged cheese promoted stretch/stringiness in this type of cheese, as well. Therefore, the invention provides those of skill in the art with a method for manufacturing cheeses having specific properties that are targeted for the specific products on/in which the cheeses will be used. For example, heat-treated cheeses intended for use on pizza can have a stretchier, stringier consistency, while cheese intended for use on cheeseburgers, for example, can be formulated to have less stretch, but desirable melting properties to allow the cheese to evenly melt over the surface of, and onto the sides of, the meat patty.

As the invention allows a cheese producer to produce heat-treated cheese without using emulsifying salts, the invention also relates to a method for reducing sodium levels in heat-treated cheese, as well as increasing calcium levels where the formulator would previously have resorted to calcium depletion to produce a heat-treated cheese having acceptable properties.

According to the United States Department of Agriculture, in 2012 the school lunch program provided meals to approximately 31 million students on a daily basis. It has been a goal of the program to provide healthy foods, and cheese made by the method of the present invention meet two important goals in child and adolescent nutrition: (1) reducing sodium consumption, and (2) increasing consumption of bone-building calcium. The inventors have demonstrated that cheese production can be accomplished without the addition of emulsifying salts, or the process of calcium depletion, to alter the structure of the cheese to produce desirable properties that make certain foods—such as pizza, cheeseburgers, and macaroni and cheese—that children and adolescents are more prone to eat, and which are served at least weekly in most school cafeterias.

Heat-treated cheeses made by the method of the invention can be used in many of the same ways that process cheeses are used, such as, for example, to produce sauces, dips, casseroles, macaroni and cheese, and other food items. The method of the invention can also expand the uses of certain cheese products, by giving those cheese products better melting properties, improved stretchy, stringy, properties, etc. For example, although we refer to cheese "melting," cheese actually does not undergo a melting process. Instead, it undergoes a "glass transition." At or its glass transition temperature, the cheese has a firm, or "glassy" state. Above the transition temperature, it turns into a more "rubbery" solid that flows easily. The elasticity, free oil, and transition temperature of a cheese influence its color uniformity in applications such as use on pizza (Ma, X. et al., Quantification of Pizza Baking Properties of Different Cheeses, and Their Correlation with Cheese Functionality, *J. of Food Sci.* (August 2014) 79(8): E1528-E1534).

According to a 2015 online article in *Food Business News*, "[t]he relationship cheese has with salt is more than flavor. It is complicated, as cheese needs salt for functionality. During the manufacture of natural cheese, salt is added to the curd once the desired pH is attained. This helps control fermentation and proteolysis by regulating starter cultures and enzymes. Salt also lowers the water activity of cheese, which prevents the growth of undesirable microorganisms. Without added salt, natural cheese would have an unacceptable soft body and very short shelf life due to undesirable microbial growth and enzymatic activity. It also would be bitter and bland." (Berry, D., Making salty cheese with less sodium, *Food Business News*, Jun. 16, 2015 (http://www.foodbusinessnews.net/articlesinews_home/Supplier-Innovations/2015/06/Making_salty_cheese_with_less.aspx?ID=%7B53F14A3C-185A-4546-9E8C-F5BBB761202D % 7D&cck=1).) However, making process cheese with emulsifying salts produces a cheese product with more sodium than many consumers are willing to accept in a product, whether for health reasons or simply for the salty taste. Alternatives have been explored, but thus far those alternatives do not provide the taste and functionality advantages provided by the method of the present invention. For example, potassium chloride provides an option, but its salty flavor is not as immediate as that of sodium chloride, and it has a bitter aftertaste. To reduce that bitter aftertaste, use of metallic blockers has been suggested. Potassium-based emulsifying salts provide a functional alternative to sodium-based emulsifying salts, but their use has been limited because of the bitter aftertaste that is associated with them. Whey permeate and milk permeate have also been suggested as a sodium alternative. These contain mostly lactose (often about 85%), minerals, sodium chloride, potassium chloride, lactic acid, citric acid, hippuric acid, uric acid, orotic acid, and urea. Frankowski et al. demonstrated that the salty taste provided by permeate is primarily due to its sodium chloride, potassium chloride, lactic acid, and orotic acid. (Frankowski, K. M. et al. The Role of Sodium in the Salty Taste of Permeate, *J. Dairy Sci.* (2014) 97:5356-5370).

The invention has been described as "comprising" certain steps and ingredients, which those of skill in the art may also "consist of" or "consist essentially of" those steps and/or ingredients. Therefore, where the term "comprising" is used and the invention is intended to be more narrowly defined, the terms "consisting of" or "consisting essentially of" may also be used to describe the invention. The invention may also be further described by means of the following non-limiting examples.

EXAMPLES

Heat-Treated Cheese Production

Two lots of colored Cheddar cheese (#1936206401 and 105169301, each about 35% fat and about 36-37 percent moisture) were shredded using the shredder attachment for a Globe SP10 stand mixer. The shredded cheese was divided into three portions. One-third of the shredded cheese was added to the cooker (Blentech Cheezetherm Model CC-0010, using the indirect steam option) along with all the butter, then mixed. Shredded cheese was again added (⅓+ ⅓), then mixed, with a 2-minute mixing time after each addition. Water and milk mineral (Optisol 01200, Glanbia Nutritionals, Inc.) were added and mixed into the cheese/butter mixture. The mixed ingredients were then heated to 175 degrees Fahrenheit, then placed into a lined box to form the process cheese as it cooled.

For production of heat-treated cheese using phospholipase, phospholipase was added to the cheese in the cooker. Results are shown in Table 2 for heat-treated cheese produced by adding PL and milk mineral to the cooker, as compared to milk mineral alone. Two phospholipase concentrations/amounts were used, designated "higher" and "lower," the higher being added as 0.16% (w/w) of finished product and the lower being added as 0.05% (w/w) of finished product.

TABLE 2

Comparisons of Heat-treated Cheese Made by Adding Milk Mineral and Phospholipase During Heat Treatment

| Ingredient(s) Added | Free Oil (% w/w of cheese) | Meltability |
|---|---|---|
| Glanbia Milk Mineral | 10.26 | 1.37 |
|  | 6.28 | 1.42 |
| Glanbia Milk Mineral + YieldMax ® (lower) | 0.54 | 1.18 |
|  | 0.75 | 1.18 |
| Glanbia Milk Mineral + YieldMax ® (higher) | 0.94 | 1.32 |
|  | 1.1 | 1.39 | phospholipase-treated cheese was also used to produce heat-treated cheese, and those results compared to results obtained with various treatments, including emulsifying salts. Results are shown in Table 3.

TABLE 3

Comparison of heat-treated cheeses using different Treatments

| Treatment | Average Free Oil (% w/w of cheese) | Average Meltability |
|---|---|---|
| SC | 1.45 | 1.49 |
| TSP/DSP | 1.32 | 1.37 |
| none | 13.11 | 1.83 |
| PH | 6.31 | 1.49 |
| PL | 8.05 | 1.36 |
| PL/PH | 3.56 | 1.34 |
| PL/MM | 9.90 | 1.53 |
| PL/MM/PH | 3.10 | 1.24 |

PH = preheat (mixing at a low temp, 95-104 F., before the cooking process);
MM = milk minerals;
PL = phospholipase;
ES = emulsifying salts;
SC = sodium citrate (an emulsifying salt);
TSP = trisodium phosphate (an emulsifying salt);
DSP = disodium phosphate (an emulsifying salt);
FC = functional cheese (a cheddar made with phospholipase);
Ch = standard natural cheddar cheese The preheat step is particularly valuable for forming a strong emulsion, and gives better emulsification strength no matter which ingredient combination it is applied to.

Functional Cheddar Made by Applying Phospholipase to the Curds Before Salting

Phospholipase (YieldMax® PL, CHR Hansen) was added in a 1:10 dilution to the cheddar curds after the whey had drained off and 15 minutes before the salt was added to the curds. 120 g of YieldMax® PL was mixed with 1100 mL of deionized water in a spray bottle and applied to the curd by manually spraying the curd in the drain table. Once completely applied (over a course of 5 minutes), the curd was allowed to mix for 15 minutes before salt was applied and the cheesemake finished in the typical fashion. The resulting functional cheese was used in heat-treatment processes to make heat-treated cheese.

What is claimed is:

1. A method for making a heat-treated cheese, the method comprising admixing with at least one shredded natural cheese a composition comprising at least one phospholipase, and heat-treating the shredded natural cheese and at least one phospholipase at a temperature of from about 165 degrees Fahrenheit to about 185 degrees Fahrenheit to produce a heat-treated cheese.

2. The method of claim 1 wherein the method for making a heat-treated cheese further comprises adding a calcium composition to the at least one shredded natural cheese.

3. The method of claim 2 wherein the calcium composition is selected from the group consisting of inorganic minerals, at least one milk mineral composition, at least an algal mineral composition, at least one plant mineral composition, and combinations thereof.

4. The method of claim 1 further comprising the step of adding to the shredded natural cheese at least one phospholipase-treated milk product.

5. The method of claim 4 wherein the at least one phospholipase-treated milk product is selected from the group consisting of milk powder, buttermilk powder, milk concentrate, milk permeate, powdered cream, cream permeate, concentrated cream, and combinations thereof.

6. The method of claim 1 wherein the natural cheese is selected from the group consisting of cheese curds, fresh cheese, aged cheese, and combinations thereof.

7. The method of claim 1 wherein the step of heat-treating is performed until the cheese is melted to a uniform molten consistency.

8. A method for making a heat-treated cheese, the method comprising preheating at least one phospholipase-treated shredded cheese at a temperature of from about 75 degrees Fahrenheit to about 120 degrees Fahrenheit, followed by heat-treating the cheese at a temperature of from about 165 degrees Fahrenheit to about 185 degrees Fahrenheit.

9. The method of claim 8 wherein the step of preheating is performed for at least about 5 minutes.

10. A method for making a heat-treated cheese, the method comprising of the steps of
    preheating at least one shredded cheese at a temperature of from about 75 degrees Fahrenheit to about 120 degrees Fahrenheit;
    heat-treating the cheese at a temperature of from about 155 degrees Fahrenheit to about 185 degrees Fahrenheit with constant agitation until a uniform molten consistency is produced, to produce a heat-treated cheese; and
    packaging and cooling the heat-treated cheese.

11. The method of claim 10 wherein the heat-treating step can be performed by direct or indirect steam injection into a kettle-type cooker.

12. The method of claim 10 wherein the preheating step is performed for at least about 5 minutes.

\* \* \* \* \*